US007986828B2

(12) United States Patent
Rao et al.

(10) Patent No.: US 7,986,828 B2
(45) Date of Patent: Jul. 26, 2011

(54) PEOPLE DETECTION IN VIDEO AND IMAGE DATA

(75) Inventors: Supriya Rao, Bangalore (IN); Chaitanya K. Paturu, Tirupathi (IN); Pramod NC, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 958 days.

(21) Appl. No.: 11/870,237

(22) Filed: Oct. 10, 2007

(65) Prior Publication Data

US 2009/0097739 A1 Apr. 16, 2009

(51) Int. Cl.
*G06K 9/62* (2006.01)

(52) U.S. Cl. ......... 382/159; 382/224; 382/103; 348/143

(58) Field of Classification Search .................. 382/155, 382/159, 224, 226, 227, 103, 115, 118; 348/143, 348/152
See application file for complete search history.

(56) References Cited

U.S. PATENT DOCUMENTS

| 2004/0091153 | A1 | 5/2004 | Nakano et al. | |
| 2004/0120581 | A1* | 6/2004 | Ozer et al. | 382/224 |
| 2006/0280341 | A1* | 12/2006 | Koshizen et al. | 382/118 |
| 2007/0098254 | A1 | 5/2007 | Yang et al. | |
| 2007/0140550 | A1* | 6/2007 | Li et al. | 382/159 |
| 2008/0175447 | A1* | 7/2008 | Kim et al. | 382/118 |

FOREIGN PATENT DOCUMENTS

JP 2005351814 A 6/2004

OTHER PUBLICATIONS

Khan et al. "Real-time Human Motion Detection and Classification." Proceedings of the IEEE Students Conference, vol. 1, Aug. 16, 2002, pp. 135-138.*
Mohan et al. "Example-Based Object Detection in Images by Components." IEEE Transactions on Pattern Analysis and Machine Intelligence, vol. 23, No. 4, Apr. 2001, pp. 349-361.*
Intellectual Property Office Combined Search and Examination Report, dated May 21, 2009 corresponding to Great Britain application No. GB0818586.0.
Agarwal, Shivani , et al., "Learning a Sparse Representation for Object Detection", *Proceedings of the 7th European Conference on Computer Vision-Part IV, Lecture Notes in Computer Science*; vol. 2353, (2002),113-130.
Dalai, N. , et al., "Histograms of oriented gradients for human detection", *IEEE Computer Society Conference on Computer Vision and Pattern Recognition, 2005. CVPR 2005*. vol. 1, (2005),886-893.
Fergus, R. , et al., "Object class recognition by unsupervised scale-invariant learning", *2003 IEEE Computer Society Conference on Computer Vision and Pattern Recognition, 2003. Proceedings*, vol. 2,, (2003),II-264-II-271.
Gavrila, D. M., et al., "Pedestrian Detection from a Moving Vehicle", *Computer Vision—ECCV 2000*, (2000),37-49.

(Continued)

*Primary Examiner* — Jon Chang
(74) *Attorney, Agent, or Firm* — Husch Blackwell

(57) ABSTRACT

A process identifies a person in image data. The process first executes a training phase, and thereafter a detection phase. The training phase learns body parts using body part detectors, generates classifiers, and determines a spatial distribution and a set of probabilities. The execution phase applies the body part detector to an image, combines output of several body part detectors, and determines maxima of the combination of the output.

20 Claims, 4 Drawing Sheets

OTHER PUBLICATIONS

Havasi, L., et al., "Pedestrian Detection Using Derived Third-Order Symmetry of Legs", *Proceedings of ICCVG*, (2004),1-7.

Leibe, B., et al., "Combined Object Categorization and Segmentation With an Implicit Shape Model", *ECCV'04 Workshop on Statistical Learning in Computer Vision*, (2004),1-16.

Leibe, B., et al., "Interleaved Object Categorization and Segmentation", *British Machine Vision Conference (BMVC'03)*, (2003),1-7.

Leibe, B., et al., "Pedestrian detection in crowded scenes", *IEEE Computer Society Conference on Computer Vision and Pattern Recognition, 2005. CVPR 2005.*, (2005),878-885.

Lienhart, R., et al., "An extended set of Haar-like features for rapid object detection", *2002 International Conference on Image Processing. 2002. Proceedings.* vol. 1, (2002),I-900-I-903.

Lowe, D., "Distinctive Image Features from Scale-Invariant Keypoints", *International Journal of Computer Vision*, 20, (2004),91-110.

Papageorgiou, C., et al., "Trainable pedestrian detection", *1999 International Conference on Image Processing, 1999. ICIP 99. Proceedings.* vol. 4, (1999),35-39.

Ulusoy, I., et al., "Generative versus discriminative methods for object recognition", *IEEE Computer Society Conference on Computer Vision and Pattern Recognition, 2005. CVPR 2005.* vol. 2, (2005),258-265.

Viola, Paul, et al., "Detecting pedestrians using patterns of motion and appearance", *Ninth IEEE International Conference on Computer Vision, 2003. Proceedings.*, (2003),734-741.

Viola, P., et al., "Robust Real-Time Face Detection", *International Journal of Computer Vision*, 57(2), (2004),137-154.

Wu, B., et al., "Detection of multiple, partially occluded humans in a single image by Bayesian combination of edgelet part detectors", *Tenth IEEE International Conference on Computer Vision, 2005. ICCV 2005.*, (2005),90-97.

\* cited by examiner

PEOPLE DETECTION IN VIDEO AND IMAGE DATA

TECHNICAL FIELD

Various embodiments relate to the field of processing video and image data, and in an embodiment, but not by way of limitation, to detecting people in video and image data.

BACKGROUND

In most video surveillance applications, a fundamental activity is the detection of objects of interest, the tracking of those objects through the video sequence, and the determination of inferences from the object's activities. Nearly all commercially available surveillance algorithms that are presently available depend upon motion detection to isolate objects of interest. However, motion detection has its limits, such as the difficulty in distinguishing between different types of moving objects (e.g., cars, people, and trees) and the difficulty in distinguishing between closely aligned objects (e.g., two people walking next to each other).

To address these problems, attempts have been made to develop techniques that are specifically designed to detect people in video data. However, even when an algorithm is specifically designed for the detection of people, difficulties persist such as large variations in global and local appearances due to changes in clothing styles and camera angles, the effect of extraneous matter such as backpacks, and the occlusion of parts of a person in a scene by other people or objects.

DETAILED DESCRIPTION

Figure 1A:
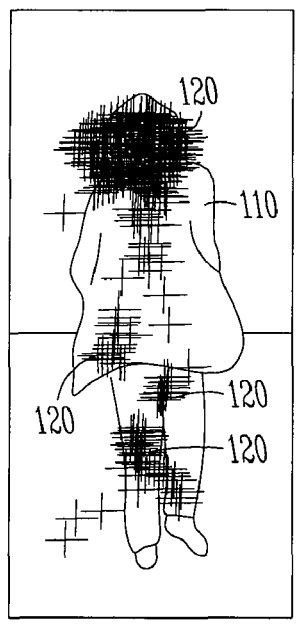
FIGS. 1A and 1B illustrate examples of output of a spatial distribution algorithm.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

Many times in a crowded scene, people in that scene are only partially visible to a camera or other video sensing device. Consequently, detection methods that attempt to detect the full body of persons are likely to fail. In this disclosure, an approach is used that uses local cues to address this problem, i.e., the disclosed approach separately learns several body parts of humans during training. Typical body parts that are learned include the head, legs, right and left shoulders, and the torso. Annotated data of these body parts are then separately fed, during training, to an Adaboost algorithm that can use Haar features to generate classifiers for the corresponding body parts. Annotated data refers to the many possible variations of a body part in terms of clothing, size, scale, and shape in many training images (up to a thousand or more). As an example, the features can be extracted from an image and classified as being part of a person. The classification could also be somewhat more specific, for example classifying features determined to be body parts such as a leg, an arm, a shoulder, or a head. During the training phase, a classifier is typically tuned to provide a high detection rate, even at the cost of a higher false alarm rate. The disclosed algorithm is able to reliably detect humans and reject false alarms despite the higher false alarm rates of the initial classifiers.

After the detection of the body parts, spatial distributions on these body parts are learned. These spatial distributions account for the natural variation in height, size, and scale of the body parts among different people. The spatial distributions also account for changes in the location of the body parts due to different poses in which a person is likely to be. These distributions also capture the performance of the body part detector itself. A body part detector can be an algorithm that examines a portion of an image to determine whether the characteristics of the pixels of that portion of the image indicate that the pixels represent a body part. The detector performance differs when presented with people of different scales. For instance, a particular detector might fire (i.e., identify a potential body part) more often at scales closer to the training scale. Also, a detector typically fires not only at a single pixel but at several pixels surrounding the object of interest. At times, since the detectors are set to have a high detection rate, despite a high false alarm rate, detections occur on multiple portions of a person. The spatial distributions are able to capture these variations as well.

Therefore, the spatial distributions (of a particular body part that is visible in the image (while other parts may be occluded)) inform of the location and scale of a person in the image or scene given that a particular body part detector has fired. That is, by identifying and classifying a particular body part, such as a person's head, the remainder of the body can be located in the scene even if occluded.

Therefore, the spatial distribution informs the location and scale of a person in a scene given that a particular body part detector has fired—i.e., it has identified a particular body part. The distribution is represented by P(x/p, l). The term x represents the row, column, and scale of the proposed hypothesis (i.e., the person), p is the part detector that has fired (i.e., which particular body part has been potentially identified), and l is the location and scale of the detected part. In order to learn these spatial distributions, humans of several different scales and aspect ratios are presented to the parts detectors during training. During training, the locations of the centroids of the persons in the scene are known a priori and are used in the construction of these spatial distributions.

Figure 1B:
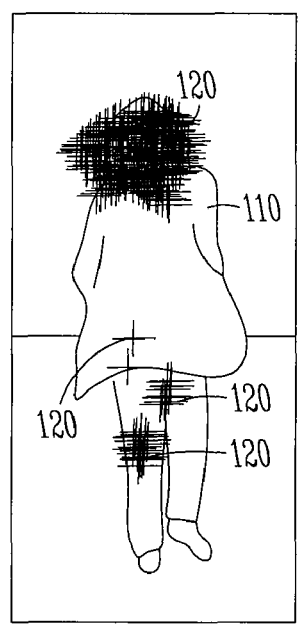

FIGS. 1A and 1B illustrate examples of an output of a spatial distribution algorithm. In FIG. 1A, a human 110 has spatial distributions 120 located about the head, torso, and legs. The locations of the centroids of the human in FIGS. 1A and 1B are known beforehand and are used in the construction of the spatial distributions. In FIG. 1B, the outliers of FIG. 1A have been removed.

In an embodiment, the accuracies of the parts detectors are modeled. Since some body parts are easier to characterize than others, the accuracies of the different body parts detectors are expected to vary. In an embodiment, a higher weight is given to those body part detectors that are more reliably detected. This weight or probability can be represented as P(H/p, l). This represents the probability that there is actually a person present when the part detector fires. This probability is calculated as the fraction of true detections of a body part detector over the number of total detections of that particular body part detector.

After the learning of the spatial distributions and the assigning of weights to the body parts detectors, a probability that a particular body part detector can fire at a location and scale is determined. This probability can be represented as P(p, l). To determine this probability, one or more persons in the training video scene can be manually marked or noted in some manner. Based on these marked persons in the image, the heights of the people at all locations in the image are interpolated. Then, given an output of a body part detector, the probability P(p, l) can be modeled as follows:

$$P(p, l) = 0.5/\text{Thr} \quad \text{if } (\text{abs}(I_h(x,y) - \text{scale}) < \text{Thr})$$
$$= 0 \quad \text{otherwise.}$$

In the above, $I_h(x,y)$ is the interpolated relative height at location (x, y) and l is equal to (x, y, scale) of the particular body part. The Thr is equal to a threshold. The threshold can be chosen as a function of the amount of change that can be tolerated in the height of a person detected from the estimated height during the training phase at a given location. A smaller value means a smaller tolerance is allowed. In the above example, the value 0.5 means that a change in height of a detected person by one-half or 1.5 times the estimated height is permitted. This variation accounts for the presence of children in a scene and the different heights of different persons.

Figure 2:
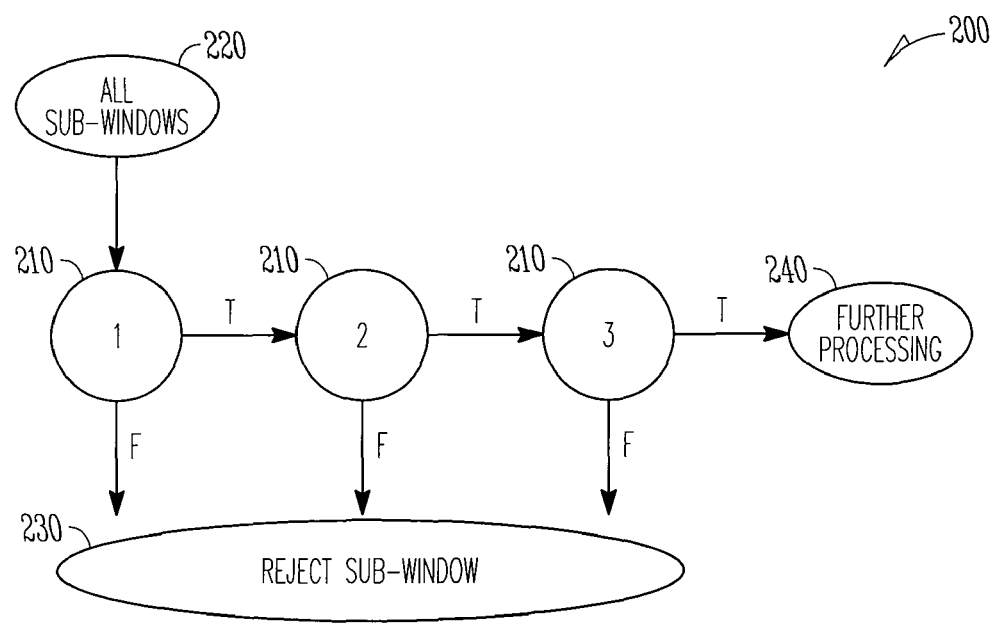
FIG. 2 illustrates an example graphical representation of an adaboost cascaded algorithm.

At the end of the training phase, the following information is available—a set of part detector adaboost cascades, and for each body part detector, a set of three probabilities—P (x/p, l), P(h/p, l), and P(p, l). As shown in FIG. 2, an adaboost cascade 200 is a cascade of weak classifiers 210 from a plurality of sub-windows 220 in an image. The result is a set of numbers representing the Haar features of the sub-windows 220, leading to the rejection of a sub-window at 230 (i.e., no body part is present in a particular sub-window) or further image processing at 240.

Figure 3A:
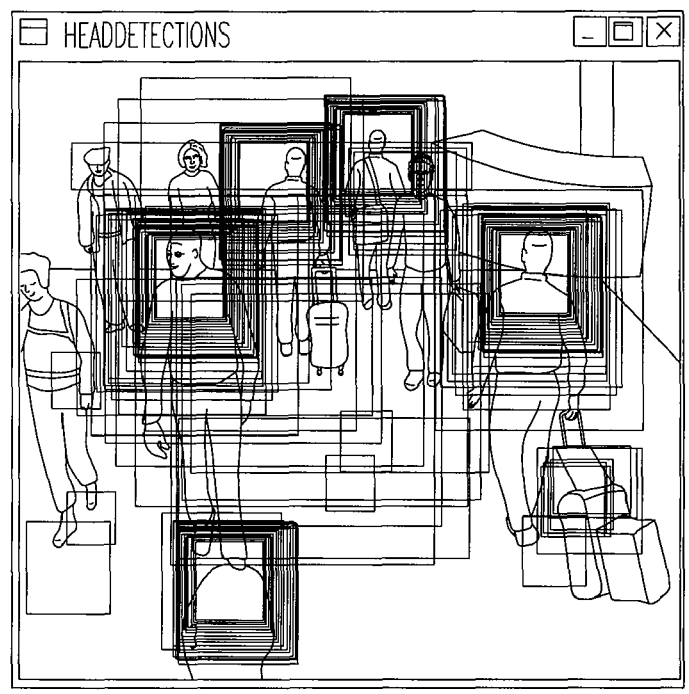
FIGS. 3A and 3B illustrate example output of a body part detector.
Figure 3B:
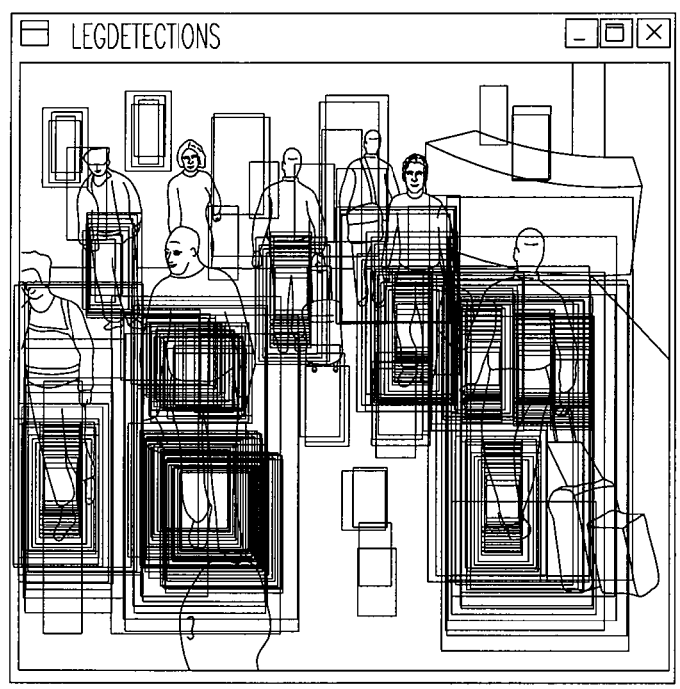

After the training phase, the information gleaned in the training phase can be used to detect humans in video and image data. In an embodiment, in the detection phase, each body part detector is individually applied to an image in order to separately detect different body parts. As disclosed above, in an embodiment, the body parts detectors are tuned to provide a rather high detection rate—even at the cost of a rather high false alarm rate. A benefit of this scheme though is that the classifier cascade is reasonably small and therefore fairly fast. The output of any particular body part detector can be somewhat noisy. This is illustrated in FIGS. 3A and 3B.

Next, in an embodiment, the detection phase combines the outputs of the various body parts detectors in order to get a unified detection of the person. In an embodiment, each body part detector votes for centroid of the person at issue in the image using its corresponding spatial distribution. The vote of each body part detector is weighted as follows:

$$P(h, x) = \Sigma P(h, x/p_i, l) * P(p_i, l)$$

$$\Sigma P(h/p_i, l) * P(x/p_i, l) * P(p_i, l)$$

The above summations are performed for each of the various body part detectors.

Figure 4:
FIG. 4 illustrates the example output of the body part detector of FIGS. 3A and 3B after filtering.

An object hypothesis is obtained by locating maxima of the body part detector voting spaces. In an embodiment, maxima of the voting space are located using a scale-varying mean shift procedure using a balloon density estimator with a uniform cubical kernel. The voting and the scale varying mean-shift procedure are extremely robust and are able to remove a substantial number of the false alarms in the scene. FIG. 4 illustrates a final output of the detection of people from the people in FIGS. 3A and 3B.

In an embodiment, as a final step, the spatial relationships between the various body parts that contribute to the hypothesis are verified to ensure that the body parts are in the correct relative location with respect to one another. The individual body part detections and the verification of the spatial relationship among these body parts address the problem of partial occlusion of a body. The detections and verification also reduce the false alarms that can occur due to background objects that match the body parts. In an embodiment, other global cues such as edge templates can be used to verify the various hypotheses obtained from the earlier processing.

Figure 5:
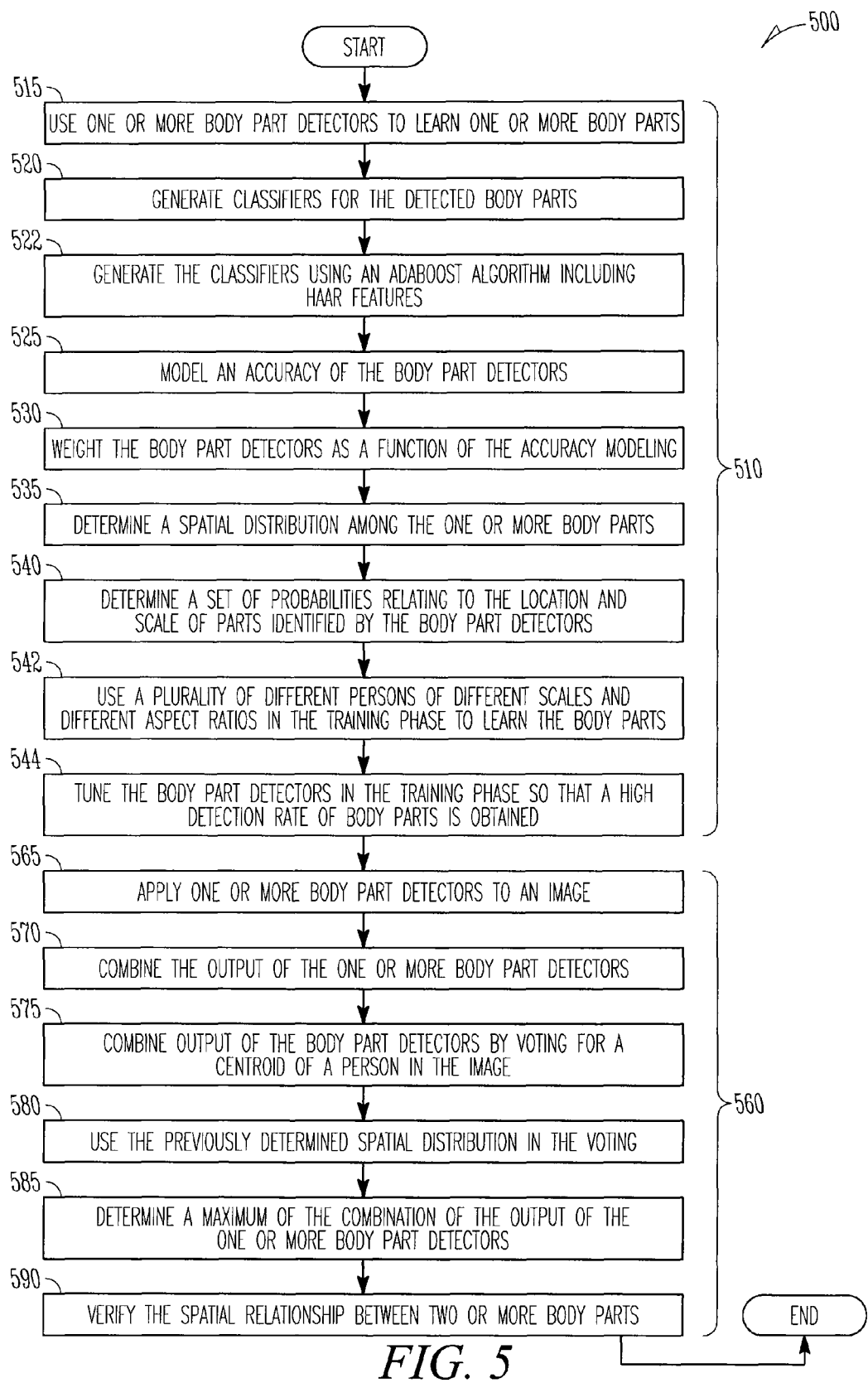
FIG. 5 illustrates a flowchart of an example process of detecting people in image data.

FIG. 5 is a flowchart of an example process 500 for detecting people in image data. FIG. 5 includes a number of process blocks 515-544 and 565-590. Though arranged serially in the example of FIG. 5, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

The process 500 includes a training phase 510 and a detection phase 560. In the training phase 510, at 515, one or more body part detectors are used to learn one or more body parts. In an example, the learned body parts include one or more of a head, a leg, a shoulder, or a torso. At 520, classifiers are generated for the detected body parts. The classifiers can be as simple and straightforward as classifying a body part as an arm, leg, head, etc. At 522, the classifiers are generated using an Adaboost algorithm including Haar features. In an example, the training phase 510 can also include at 525 a modeling of an accuracy of the body part detectors, and at 530, a weighting of the body part detectors as a function of the accuracy modeling. The accuracy modeling can include a ratio of the number of true detections by a body part detector to the number of total detections by a body part detector. At 535, a spatial distribution is determined among the one or more body parts, and at 540, a set of probabilities is determined relating to the location and scale of parts identified by the body part detectors. At 542, a plurality of different persons of different scales and different aspect ratios are used in the training phase 510 to learn the body parts. At 544, the body part detectors are tuned in the training phase 510 so that a high detection rate of body parts is obtained.

In the detection phase 560, at 565, one or more body part detectors are applied to an image. At 570, the output of the one or more body part detectors are combined. At 575, output of the body part detectors are combined by voting for a centroid of a person in the image. At 580, the previously determined spatial distribution is used in the voting. At 585, a maximum of the combination of the output of the one or more body part detectors is determined. At 590, the spatial relationship between two or more body parts is verified.

In the foregoing detailed description, various features are grouped together in one or more examples for the purpose of streamlining the disclosure. This method of disclosure is not to be interpreted as reflecting an intention that the claimed examples of the invention require more features than are expressly recited in each claim. Rather, as the following claims reflect, inventive subject matter lies in less than all features of a single disclosed example. Thus the following claims are hereby incorporated into the detailed description as examples of the invention, with each claim standing on its own as a separate example. It is understood that the above description is intended to be illustrative, and not restrictive. It is intended to cover all alternatives, modifications and equivalents as may be included within the scope of the invention as defined in the appended claims. Many other examples will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A process to identify a person in image data comprising:
   executing a training phase, the training phase comprising:
   using one or more body part detectors to learn one or more body parts;
   generating classifiers for the one or more body parts;
   determining a spatial distribution among the one or more of the body parts; and
   determining a set of probabilities, the set of probabilities relating to one or more of a probable location and scale of the person in the image data given that a particular body part detector has fired, a probability that there is a person in the image data given that a particular body part detector has fired, and a probability that a particular body part detector can fire at a particular location and a particular scale; and
   executing a detection phase, the detection phase comprising:
   applying the one or more body part detectors to an image;
   combining output of the one or more body part detectors; and
   determining a maximum of the combination of output of the one or more body part detectors.

2. The process of claim 1, comprising:
   modeling an accuracy of the one or more body part detectors; and
   weighting the body part detectors as a function of the accuracy modeling.

3. The process of claim 2, comprising computing a ratio of true detections by the one or more body part detectors to the number of total detections by the one or more body part detectors to model the accuracy of the learned body parts.

4. The process of claim 1, comprising using a plurality of persons comprising different scales and different aspect ratios to learn the one or more body parts.

5. The process of claim 1, comprising voting for a centroid of the person and using a result of the voting to combine the output of the one or more body part detectors.

6. The process of claim 5, comprising using the spatial distribution in the voting.

7. The process of claim 1, wherein the body parts include one or more of a head, a leg, a shoulder, and a torso.

8. The process of claim 1, wherein the generating classifiers for the one or more body parts includes an Adaboost algorithm using Haar features.

9. The process of claim 1, comprising tuning the one or more body part detectors in the training phase to provide a high detection rate.

10. The process of claim 1, comprising verifying a spatial relationship between two or more body parts, thereby verifying the relative location of the two or more body parts.

11. A process to identify an object in image data comprising:
    executing a training phase, the training phase comprising:
    using one or more part detectors to learn one or more parts of the object;

generating classifiers for the one or more parts;
determining a spatial distribution among the one or more parts; and
determining a set of probabilities, the set of probabilities relating to one or more of a probable location and scale of the object in the image data given that a particular part detector has fired, a probability that there is an object in the image data given that a particular part detector has fired, and a probability that a particular part detector can fire at a particular location and a particular scale; and executing a detection phase, the detection phase comprising:
applying the one or more part detectors to an image;
combining output of the one or more part detectors; and
determining a maximum of the combination of output of the one or more part detectors.

12. A non-transitory machine-readable medium comprising instructions, which when implemented by one or more processors perform the following operations:

execute a training phase, the training phase comprising:
use one or more body part detectors to learn one or more body parts;
generate classifiers for the one or more body parts;
determine a spatial distribution among the one or more of the body parts; and
determine a set of probabilities, the set of probabilities relating to one or more of a probable location and scale of the person in the image data given that a particular body part detector has fired, a probability that there is a person in the image data given that a particular body part detector has fired, and a probability that a particular body part detector can fire at a particular location and a particular scale; and execute a detection phase, the detection phase comprising:
apply the one or more body part detectors to an image;
combine output of the one or more body part detectors; and
determine a maximum of the combination of output of the one or more body part detectors.

13. The non-transitory machine-readable medium of claim 12, comprising instructions to:
model an accuracy of the one or more body part detectors; and
weight the body part detectors as a function of the accuracy modeling.

14. The non-transitory machine-readable medium of claim 13, comprising instructions to compute a ratio of true detections by the one or more body part detectors to the number of total detections by the one or more body part detectors to model the accuracy of the learned body parts.

15. The non-transitory machine-readable medium of claim 12, comprising instructions to use a plurality of persons comprising different scales and different aspect ratios to learn the one or more body parts.

16. The non-transitory machine-readable medium of claim 12, comprising instructions to vote for a
centroid of the person and using a result of the voting to combine the output of the one or more body part detectors.

17. The non-transitory machine-readable medium of claim 16, comprising instructions to use the spatial distribution in the voting.

18. The non-transitory machine-readable medium of claim 12, wherein the body parts include one or more of a head, a leg, a shoulder, and a torso.

19. The non-transitory machine-readable medium of claim 12, wherein the generating classifiers for the one or more body parts includes an Adaboost algorithm using Haar features.

20. The non-transitory machine-readable medium of claim 12, comprising instructions to:
tune the one or more body part detectors in the training phase to provide a high detection rate; and
verify a spatial relationship between two or more body parts, thereby verifying the relative location of the two or more body parts.

* * * * *